(12) United States Patent
Hawkins et al.

(10) Patent No.: US 7,873,452 B2
(45) Date of Patent: Jan. 18, 2011

(54) METHOD AND SYSTEM FOR CONTROLLING A VEHICLE POWERTRAIN BASED UPON ACTUAL VEHICLE LOAD

(75) Inventors: Jeffery Scott Hawkins, Farmington Hills, MI (US); Charles Chapin Blake, Commerce, MI (US)

(73) Assignee: Detroit Diesel Corporation, Detroit, MI (US)

( * ) Notice: Subject to any disclaimer, the term of this patent is extended or adjusted under 35 U.S.C. 154(b) by 709 days.

(21) Appl. No.: 11/833,268

(22) Filed: Aug. 3, 2007

(65) Prior Publication Data

US 2009/0037047 A1 Feb. 5, 2009

(51) Int. Cl.
*G06F 7/00* (2006.01)

(52) U.S. Cl. .............................. 701/36; 701/1; 701/103; 701/104; 701/55; 701/67; 177/136; 177/139; 477/70; 477/97; 477/174; 477/900

(58) Field of Classification Search .................... 701/36, 701/1, 55, 67, 103, 104; 177/136, 139; 477/70, 477/97, 174, 900
See application file for complete search history.

(56) References Cited

U.S. PATENT DOCUMENTS

| | | | |
|---|---|---|---|
| 5,406,862 A * | 4/1995 | Amsallen ................. 74/336 R |
| 5,528,499 A | 6/1996 | Hagenbuch | |
| 5,568,748 A * | 10/1996 | Carlson et al. ............ 74/336 R |
| 5,631,832 A | 5/1997 | Hagenbuch | |
| 5,995,888 A | 11/1999 | Hagenbuch | |
| 6,037,550 A * | 3/2000 | Bradley ....................... 177/136 |
| 6,085,725 A | 7/2000 | Goode et al. | |
| 6,089,207 A | 7/2000 | Goode et al. | |
| 6,167,357 A | 12/2000 | Zhu et al. | |
| 6,378,359 B1 * | 4/2002 | Dobson et al. ........... 73/114.75 |
| 6,438,510 B2 | 8/2002 | Zhu et al. | |
| 6,554,742 B2 | 4/2003 | Milender et al. | |
| 6,676,561 B2 * | 1/2004 | Fritzer et al. ................... 477/70 |
| 6,721,680 B2 | 4/2004 | Sorrells et al. | |
| 6,803,530 B2 | 10/2004 | Carlstrom et al. | |
| 6,920,383 B2 | 7/2005 | Graf et al. | |
| 2002/0132699 A1 | 9/2002 | Bellinger | |
| 2003/0027686 A1 | 2/2003 | Shibata | |
| 2003/0135320 A1 * | 7/2003 | Bellinger ..................... 701/103 |
| 2003/0216847 A1 | 11/2003 | Bellinger | |
| 2004/0002806 A1 * | 1/2004 | Bellinger ..................... 701/104 |
| 2004/0079557 A1 * | 4/2004 | Saxon et al. ................. 177/136 |
| 2004/0178005 A1 * | 9/2004 | Carlstrom et al. .......... 177/139 |
| 2007/0088465 A1 * | 4/2007 | Heffington ..................... 701/1 |
| 2008/0254941 A1 * | 10/2008 | Scott et al. .................. 477/169 |
| 2009/0036267 A1 * | 2/2009 | Bellinger ..................... 477/97 |

* cited by examiner

*Primary Examiner*—Khoi Tran
*Assistant Examiner*—Jonathan L Sample
(74) *Attorney, Agent, or Firm*—Bill C. Panagos; Rader, Fishman & Grauer PLLC

(57) ABSTRACT

A method and system for controlling an engine controller in response to actual vehicle load.

16 Claims, 3 Drawing Sheets

METHOD AND SYSTEM FOR CONTROLLING A VEHICLE POWERTRAIN BASED UPON ACTUAL VEHICLE LOAD

BACKGROUND OF THE INVENTION

1. Field of the Invention

In the past, actual vehicle loading information has not been readily accessible to vehicle powertrains. With increased communication between various components in a vehicle powertrain, various powertrain controllers can have access to actual vehicle load information and modify their operation in response the actual vehicle load.

The present invention relates to a system for controlling the operation of a vehicle powertrain based upon actual vehicle load.

The present invention further relates to a method to control the operation of a vehicle powertrain using vehicle load as one parameter to limit engine operation.

The present invention further relates to a system to determine the actual vehicle load (vehicle weight) of a vehicle powertrain and modify the operation of the vehicle powertrain based upon the actual vehicle load.

The present invention further relates to a method to control the operation of a heavy duty diesel engine vehicle powertrain based upon sensing the actual vehicle load and modifying cruise control set speed, engine compression brakes, electronic broadcast systems, vehicle speed limits, engine brakes, torque limits, engine speed and fueling strategies. Various vehicle components transmit information onto a digital communications link where the information can be used by other electronic control units (ECU). For example, an ECU measuring vehicle load can broadcast the information onto a digital communications link, such as a CAN network and vehicle components, such as the transmission, receive the messages and make determinations whether to change shift points on the basis of vehicle loading.

2. Description of the Related Art

Hagenbuch, U.S. Pat. No. 5,631,832 discloses an apparatus for processing data derived from the weight of a load carried by a haulage vehicle. The apparatus includes a sensor processing unit for receiving data from pressure transducers and, in response thereto, or detecting a change in the weight of the load and formulating data indicative of hauling conditions of the vehicle. The pressure data and indications of changes in the data are used by the sensor processing unit to establish a historical database from which various hauling parameters may be modified either by the sensor processing unit itself or by a remotely located central station linked to the onboard processing unit. Preferably, additional sensors are added to the vehicle to provide additional data that when, taken with the weight data, provides a historical database which more completely reflects vehicle operating conditions. The accumulated data of the historical database are used to formulate management decisions directed to the future operation of the vehicle and with this operation then intended to achieve a pre-determined management goal. The management decisions relate to routes taken and loads carried so that management is better apprised as to the efficiency of operation of the trucks under heavy load conditions.

Goode, et al., U.S. Pat. No. 6,085,725 discloses a vehicle with an internal combustion engine having throttle control. The throttle control is responsive to a vehicle operator to generate a throttle setting signal to adjust vehicle speed. An operator controlled input device is also provided to generate a selected signal corresponding to a selected one of a number of pre-determined engine control relationships. A controller responds to the selection signal to govern engine operation in accordance with the selected one of the relationship and the throttle setting signal. The throttle control has a different performance characteristic for each of the relationship and is adjustable by the operator to increase or decrease speed for each of the relationships. The relationships may each correspond to a different type of engine governing technique and include different group characteristics.

Zhu, et al., U.S. Pat. No. 6,167,357 discloses a method and apparatus for recursively estimating vehicle mass and/or aerodynamical efficiency of a moving vehicle. The vehicle speed and push force data are collected and a segment of qualified data is selected from the collected data. Newton's Second Law is integrated to express the vehicle mass and/or aerodynamic co-efficient in terms of vehicle push force and vehicle speed. The expression is then used in a recursive analysis of the qualified data segment to determine an estimated vehicle mass and/or aero dynamic co-efficient.

Zhu, et al., U.S. Pat. No. 6,438,510 discloses a method and apparatus for recursive estimation of vehicle mass and aero dynamical efficient of a moving vehicle. The vehicle speed and push data are collected in the segment of qualified data is then selected from the collected data. Newton's Second Law is integrated to express vehicle mass and/or aero dynamic co-efficient in terms of vehicle push force and vehicle speed. The expression is then used in a recursive analysis of the qualified data segment to determine if estimated vehicle mass and/or aero dynamic co-efficient.

Sorrells et al., U.S. Pat. No. 6,721,680 discloses a method for promoting compliance by a vehicle operator with a payload standard for a vehicle. The actual payload weight of the vehicle is determined. The actual payload weight is compared with a payload standard in memory to determine if the actual payload weight is in compliance with the payload standard. The operation of the vehicle is limited if the actual payload weight is not in compliance with the payload standard.

Carlstrom, et al., U.S. Pat. No. 6,803,530 discloses a vehicle onboard measurement of axle load and gross combined vehicle weight for a vehicle equipped with an air bladder suspension by allowing for suspension hysteresis. Suspension hysteresis results in at least two distinct inner pressures being possible in an air bladder for a single load. The system reduces the disruptive effect of vehicle acceleration and deceleration on load determination. The vehicle drive train management is enhanced using the load information to effect transmission gear selection.

Graf et al., U.S. Pat. No. 6,920,383 discloses a method for controlling a drive train on a motor vehicle. The method operates by recognition of a slow driving condition within which a creeping function is activated. A set rule of torque is derived by a wheel torque interpretation such that firstly a target speed is achieved and subsequently the vehicle is maintained within a speed range about the target speed.

SUMMARY OF THE INVENTION

The present invention relates to a system for sensing the actual vehicle load and transmitting that information to the engine controller, which then provides for improved powertrain control based upon the vehicle loading. The system may control at least one of the following powertrain systems: Adaptive Cruise Control systems (cruise control systems that utilize radar detection for the purpose of collision avoidance), cruise control with engine compression brakes, brake application force and timing, vehicle speed limit, engine brakes, engine torque limits, torque limiting due to engine protection, engine speed, and engine speed beyond vehicle speed limit.

Transmission shift points may also be influenced via a digital communications link (such as controller area network (CAN)) wherein the engine ECM transmits messages concerning engine operating parameters which are received by various components in the vehicle power train. The transmission component processor unit (CPU) may modify shift points, engine synchronization, or clutch/gear engagement/disengagement strategies based upon such messages to provide for smooth operation of the vehicle power train and to ensure the transmission is in the optimum gear for the terrain and load.

The present invention further relates to a method for using the actual vehicle weight or load, as transmitted by the measuring device on the data link, for modifying powertrain operating parameters, thereby influencing the operation of other powertrain components based upon actual vehicle load.

More particularly, the present invention relate to a method for using actual vehicle weight or load, communicating the load information to various vehicle components including the engine, and using the messages to assisting modification of Adaptive Cruise, Engine output, Vehicle braking and transmission control.

The various systems that receive the message concerning vehicle load may be altered in a number of ways. For example, when adaptive cruise is modified, the adaptive cruise system uses the load information to adjust cruise control set speed and/or vehicle following distance. When the engine controller receives a message regarding vehicle load, the engine controller modifies or adjusts performance of several systems based upon vehicle load. For example, the engine control may be modified based upon vehicle load and terrain traveled for fuel efficiency or performance; the controller may set the horsepower to torque ratio or cruise control with engine brakes based upon the speed deltas at which various load levels of engine braking are enabled to maintain cruise control set speed. The controller may modify the maximum vehicle speed limit, the maximum vehicle speed for "power burst" to gain momentum to permit the vehicle to more economically reach the top of the next hill in such terrain, the engine brake controls, including compression brakes and engine brakes and transmission retarders may also be altered based upon vehicle load. Finally, the controller may alter the engine maximum torque limits based upon vehicle load. When the vehicle braking control system receives a vehicle load message, the vehicle braking control system modifies or adjusts braking levels and timing for application of brakes. Wheel speed and vehicle speed braking thresholds are also altered based upon vehicle loading information. Finally, when the transmission controller receives a message over the CAN regarding the vehicle loading, the transmission control system modifies or adjusts the transmission shift points and synchronization requirements based upon the vehicle loading information.

These and other objects and aspects of the invention may become apparent upon a reading of the specification and resort to the drawings.

DETAILED DESCRIPTION OF THE PREFERRED EMBODIMENT(S)

Figure 1:
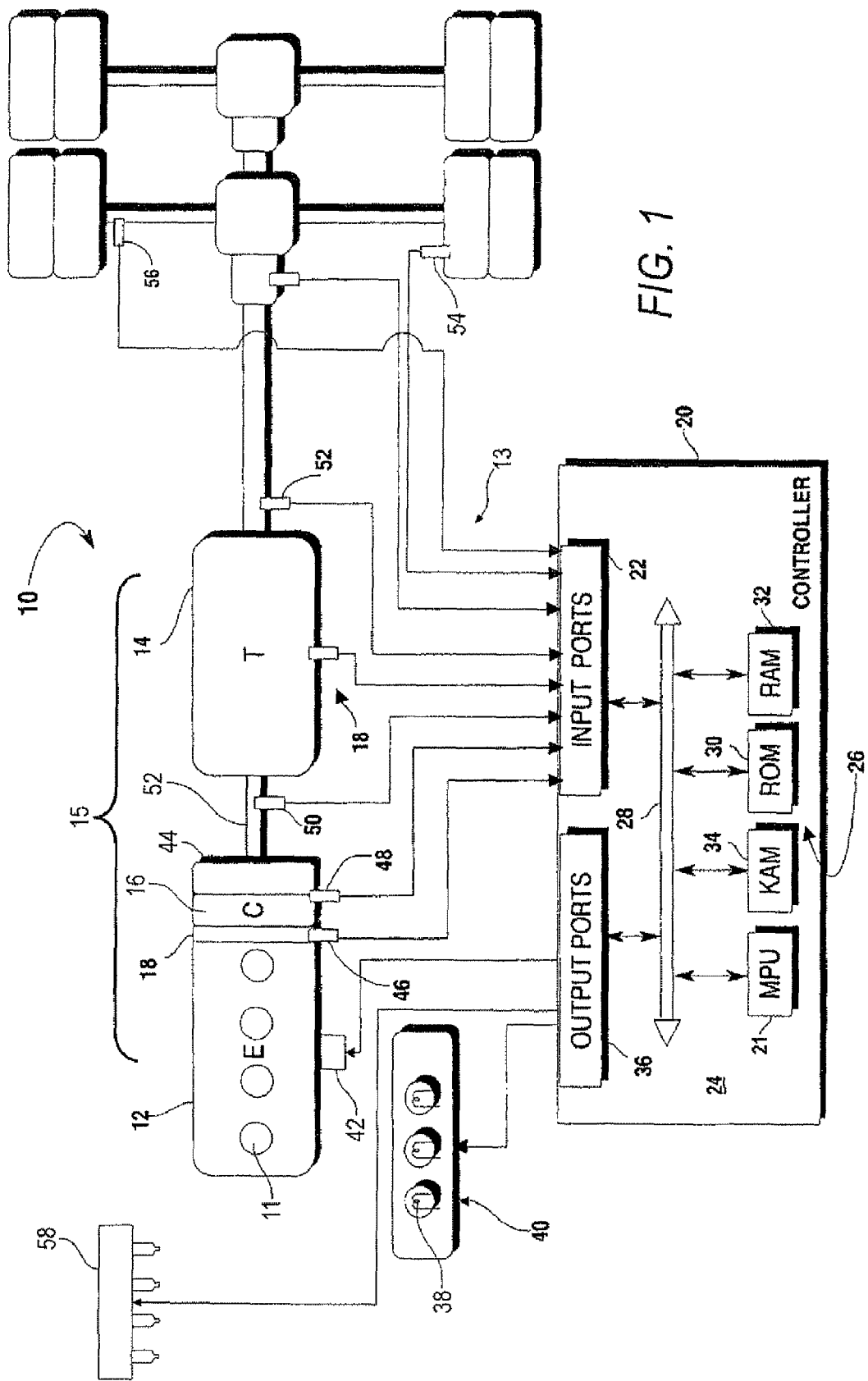
FIG. 1 is a schematic block representation of a vehicle engine system of one aspect of the present invention.

Referring now to FIG. 1, a block diagram illustrating a system including a system for controlling a vehicle powertrain based upon actual vehicle load according to the present invention is shown. The system is particularly suited for use in a vehicle, indicated generally by reference numeral 10, which typically includes an engine 12 coupled to a transmission 14 via a master friction clutch 16. In one embodiment, engine 12 is a compression-ignition internal combustion engine, such as a four, six, eight, or more cylinder diesel engine. Transmission 14 is typically a multiple gear ratio transmission which is manually or semi-automatically actuated to select one of the available gear ratios. Master friction clutch 16 may be manually or automatically controlled by a clutch actuator (not specifically illustrated) as is well known in the art. The engine, transmission, and clutch are the vehicle powertrain 15. The vehicle powertrain is shown in accordance with one non-limiting aspect of the present invention. The vehicle powertrain may provide power for driving any number of vehicles, including on-highway trucks, construction equipment, marine vessels, stationary generators, automobiles, trucks, tractor-trailers, boats, recreational vehicle, light and heavy-duty work vehicles, and the like.

Vehicle 10 may also include various sensors 18 for generating signals indicative of corresponding operational conditions or parameters of engine 12, transmission 14, clutch 16, and the like. Sensors 18 are in electrical communication with a controller 20 via input ports 22. Controller 20 preferably includes a microprocessor 24 in communication with various computer readable storage media 26 via data and control bus 28. Computer readable storage media 26 may include any of a number of known devices which function as a read-only memory (ROM) 30, random access memory (RAM) 32, keep-alive memory (KAM) 34, and the like. The computer readable storage media may be implemented by any of a number of known physical devices capable of storing data representing instructions executable via a computer such as controller 20. Known devices may include but are not limited to PROMs, EPROMs, EEPROMs, flash memory, and the like in addition to magnetic, optical and combination media capable of temporary or permanent data storage.

Computer readable storage media 26 include data representing various program instructions, software, and control logic to effect control of various systems and sub-systems of vehicle 10, such as engine 12, transmission 14, and the like. Controller 20 receives signals from sensors 18 via input ports 22 and generates output signals which may be provided to various actuators and/or components via output ports 36. Signals may also be provided to a display device 40 which includes various indicators such as lights 38 to communicate information relative to system operation to the operator of the vehicle.

Sensors 18 preferably include an engine speed sensor 42. Engine speed may be detected using any of a number of known sensors which provide signals indicative of rotational speed for flywheel 44, or various internal engine components such as the crankshaft, camshaft, or the like. In a preferred embodiment, engine speed is determined using a timing reference signal generated by a multi-tooth wheel coupled to the camshaft. A clutch sensor 46 may be provided to determine the clutch slip or engagement position of master friction clutch 16. An input shaft speed sensor 48 may be provided to determine the input speed of transmission 14. An output shaft sensor 50 may be provided to detect the rotational speed of output shaft 52. Wheel speed sensors, such as sensor 54, may be used to provide an indication of the current wheel speed of one or more vehicle wheels. Such sensors are commonly used in traction control systems (TCS) and anti-lock braking systems (ABS). Of course, one or more sensors may provide signals to various other controllers which are eventually communicated to controller 20 rather than being directly connected via input ports 22 as illustrated in FIG. 1.

The controller 20 may include a microprocessor unit (MPU) 21 in communication with various computer readable storage media via a data and control bus 28. The computer readable storage media may include any of a number of known devices which function as read only memory 30, random access memory 32, and non-volatile random access memory 34.

The system 13 may include an injection mechanism 58 for controlling fuel and/or air injection for the cylinders 11. The injection mechanism 58 may be controlled by the controller 20 or other controller and comprise any number of features, including features for injecting fuel and/or air into a common-rail cylinder intake and a unit that injects fuel and/or air into each cylinder individually. For example, the injection mechanism 58 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 58 may include more or less of these features and is not intended to be limited to the features described above.

In operation, the controller receives signals from various engine/vehicle sensors and executes control logic embedded in hardware and/or software to control the system. The computer readable storage media may, for example, include instructions stored thereon that are executable by the controller to perform methods of controlling all features and subsystems in the system 10. The program instructions may be executed by the controller in the MPU 21 to control the various systems and subsystems of the engine and/or vehicle through the input/output ports. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

Vehicle 10 is equipped with weight sensors 56 disposed in close proximity to the load bearing axles of a vehicle. The weight sensors may be sensors or electronic scales that are in electronic communication with the engine controller via the CAN to transmit actual vehicle load data from the load bearing axles to the engine controller to modify the operating parameters of the engine. In addition, the various powertrain controllers transmit messages over the powertrain data link (such as CAN) in the vehicle, which are received by the various powertrain electronic control units (ECUs). One such component is the transmission. Upon receipt of a message from the ECU containing the vehicle load information, the transmission ECU determines whether to modify its operation responsive to messages concerning vehicle loading. For example, to make a determination whether and to what extent, it may modify its operation such as its shift points or engine synchronization strategies. Similarly, other powertrain ECUs may modify their operation based on vehicle loading information received over the powertrain data link. For example, in adaptive cruise control systems, the cruise control set speed and or following distance may be modified, based upon vehicle loading. If cruise control with engine compression brakes is modified, the feature requests increasing levels of engine compression braking based upon increasing rates of change above the vehicle set speed threshold. If the vehicle weight or loading is known, the vehicle speeds at which various engine braking is requested can also be modified. Based upon vehicle load, EBS systems are modified as brake application force and timing may be modified based upon vehicle loading.

Vehicle loading can also alter the Vehicle Speed Limits. An unloaded vehicle traveling down a road may be allowed a higher Vehicle Speed Limit (VSL) for down hill power bursts to gain momentum for the next hill. For example, it may be desirable for the driver to identify a location near the bottom of the grade (perhaps by double pumping the throttle pedal) that would allow extended engine rpm allocation beyond VSL, with a decrease in power so as to never allow increased vehicle speeds beyond VSL on level terrain. It is contemplated that this feature could be operator programmable (as BPmph) with regard to increases in vehicle speed faster than VSL. The extended droop function would be tailored so as to initiate the extended engine rpm as the sum of VSL+BPmph) at 50% rated power at the point of VSL and extend to 0% rated power at BPmph beyond VSL. It is contemplated that this feature could be adjustable, based upon vehicle loading.

Engine brake control may be altered based upon vehicle loading. For example, engine brakes may be limited or completely disabled if the vehicle is lightly loaded.

Engine torque limits may be adjusted based upon vehicle loading. A loaded vehicle may require additional torque when traveling and an unloaded vehicle may require much less torque. Thus a fully loaded vehicle may have one engine torque limits available to it while it is loaded, and a different torque limit is available when the vehicle is no longer loaded. Thus, it can be readily apparent that the system and method provide for different torque depending upon the loaded condition of the vehicle, thereby improving fleet efficiencies and fuel economy. In addition, the amount of engine torque limiting due to engine protection features may be modified based upon vehicle loading. Accordingly, based upon the actual vehicle load, the engine torque limits may be modified.

Other powertrain components may modify their operation based upon messages broadcast from the engine controller over the vehicle CAN. For example, transmission shift points and synchronization requirements may be modified based upon vehicle loading. In this regard, if VSL or torque limit message are received by the transmission CPU over the CAN, the transmission CPU may alter or modify its operation to accommodate the engine operating conditions as transmitted via messages over the CAN. Such transmitted messages are usually transmitted over a J1939 diagnostic link.

Figure 2:
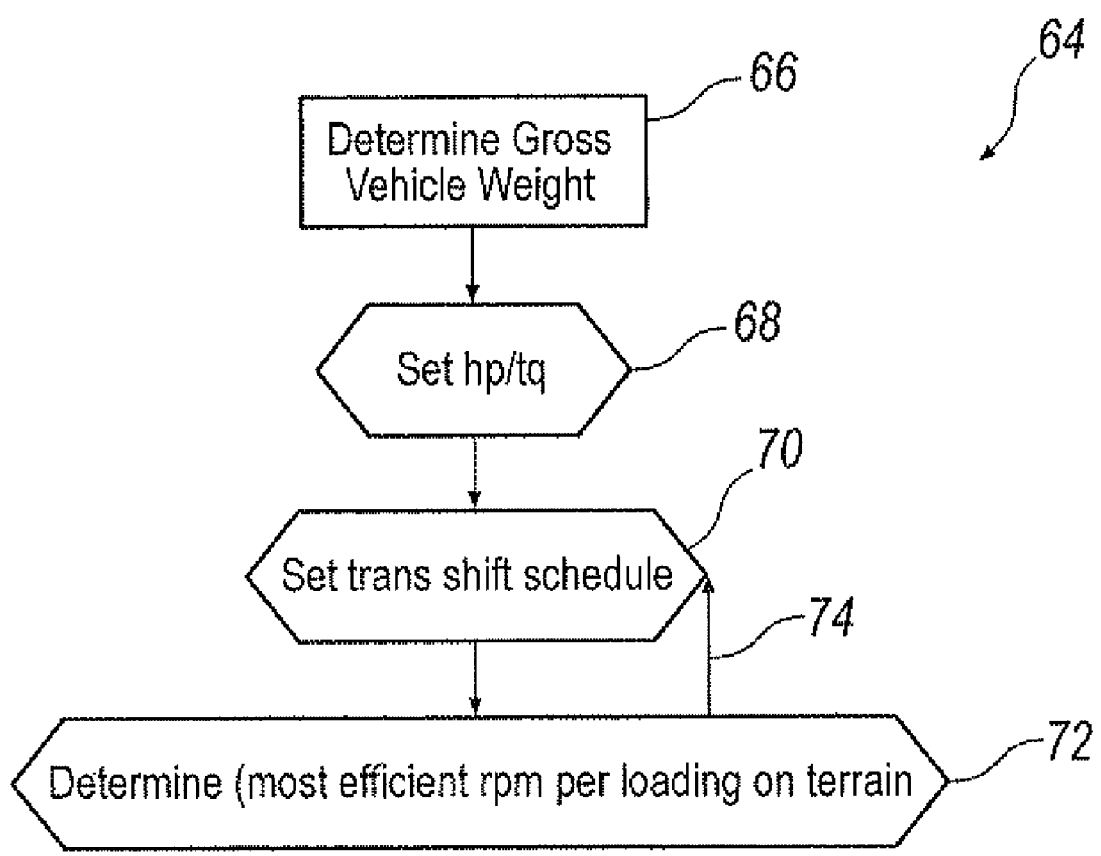
FIG. 2 is a schematic representation of a software flowchart showing one method of modifying the operation of a powertrain based upon loads perceived.

FIG. 2 is a flow chart depicting a method 64 of the controller to modify transmission operation based upon loads perceived. Step 66 is determining a gross vehicle weight upon a gross vehicle weight. The controller at step 68 sets the horsepower to torque (hp/tq) ratio. Hp/tq is used to generate messages over the CAN regarding the operation of the engine in response to the actual vehicle load. At Step 70, the messages regarding hp/tq are transmitted to a transmission CPU to set a shift schedule for the transmission that is compatible with the hp/tq of the engine. The transmission sets a shift schedule based upon hp/tq, and transmits that message to the engine controller over the CAN. At step 72, the controller 20 uses the transmission shift schedule to determine the most efficient engine speed (rpm) per actual loading on the terrain being traveled. The most sufficient rpm is then communicated at step 74 to the transmission CPU to further set the transmission shift schedule in a loop, so that the transmission is continually receiving the most efficient rpm message from the engine to permit the transmission to set the shift schedule based upon the most efficient rpm per loading on any operating terrain.

Figure 3:
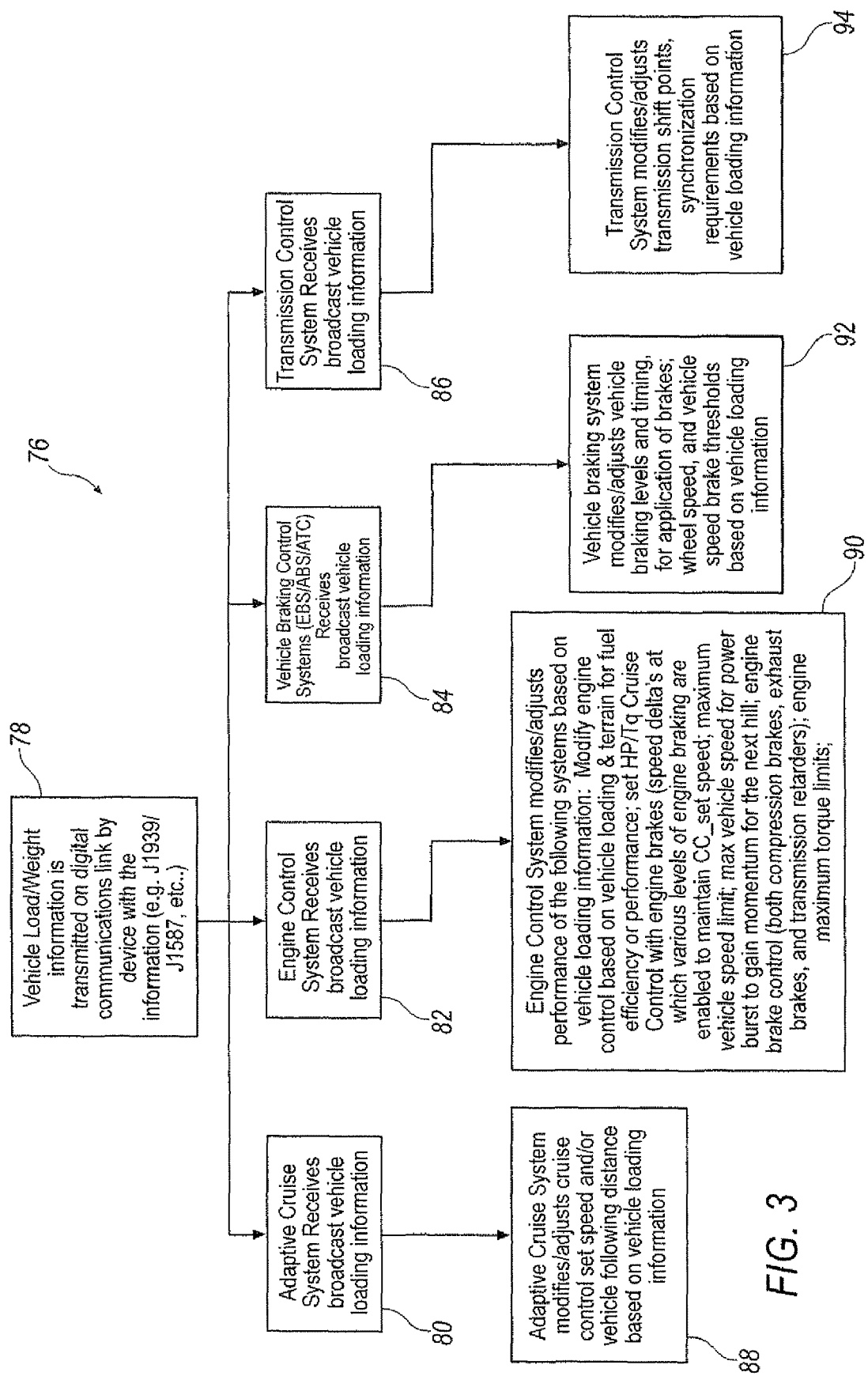
FIG. 3 is a schematic representation of a software flow chart indicating the control of various vehicle powertrain systems based upon vehicle load.

Turning now to FIG. 3, method 76 is depicted schematically. Specifically, at step 78, vehicle weight/load information is transmitted on a digital communications link such an SAE J1939/J1587 data link over the vehicle CAN. At step 80, the Adaptive Cruise Control System receives the vehicle load message broadcast.

Similarly, at step 82 the engine controller receives the vehicle loading information, and at step 84 the Vehicle braking Control System receives the vehicle load message over the CAN. The Vehicle Braking Control Systems include the Engine Brake System (EBS), Anti Brake System (ABS) and ATC. At step 86, the transmission controller receives the vehicle load messages over the CAN. Generally steps 80 through 86 happen simultaneously in parallel, however, it is contemplated that they may receive the messages serially.

When the Adaptive Cruise Control System receive a message regarding vehicle loading, step 88 modifies or adjusts cruise control set speed and or vehicle follow distance based upon the vehicle load.

When the Engine Control System receives a broadcast message concerning vehicle loading, step 90 indicates the engine control system modifies or adjusts engine performance by at least one engine control parameter based upon vehicle loading information. For example, fueling may be modified based upon vehicle loading and terrain for improved fuel efficiencies. Another parameter that may be modified is to vary the change in speed (speed delta) at which various levels of engine braking occurs to maintain cruise control set speed. Another parameter that may be controlled as a vehicle speed limit (VSL), a maximum vehicle speed on hilly terrain to gain maximum momentum for the next hills, engine brake control, including compression brake, exhaust brake, and transmission retarders, and engine maximum torque limits.

At step 92 the vehicle braking control system modifies or adjusts braking pressure sensory to apply brakes, braking levels and timing for brake application. In addition, with regard to wheel speed and vehicle speed brake thresholds based upon vehicle loading information may be modified based upon vehicle load.

At step 94, the transmission controller, in response to messages over the CAN, modifies or adjusts transmission shift points and synchronization requirements based upon vehicle loading information.

While several embodiments have been described, it is apparent that the words used in the description are words of description and not words of limitation. Many modifications and variations will become apparent to those skilled in the art upon a reading of this specification without departing from the scope and spirit of the invention as set forth in the appended claims.

What is claimed as new and desired to be protected by Letters Patent of the United States is:

1. A method for controlling vehicle powertrain comprising an electronically controlled engine with an ECM with memory, based upon actual vehicle load, comprising:
    determining the actual vehicle weight as vehicle load;
    transmitting said vehicle load over a digital communication link to multiple vehicle powertrain components;
    modifying engine operating parameters based upon the actual vehicle load;
    transmitting messages regarding said modified engine operating parameters over said digital communication link to be received by the powertrain components thereby changing operation of said powertrain components based upon said messages.

2. The method of claim 1, wherein said actual vehicle weight is determined by pressure sensors located in close proximity to vehicle load bearing axles;
    said sensors generating signals indicative of weight and transmitting said signals to said ECM.

3. The method of claim 1, wherein said actual vehicle weight is determined by scales located in close proximity to vehicle load bearing axles; said scales generating data signals indicative of weight and transmitting said signals over the digital communication link to said powertrain components.

4. The method of claim 1, wherein said engine operating parameters are at least one of engine torque limits, vehicle speed limits, engine speed, engine brake application force, engine brake application timing, adaptive cruise control, vehicle follow distance, and cruise control.

5. The method of claim 1, wherein said powertrain component is a transmission with a Electronic Control Unit (ECU) to modify transmission shift points, engine synchronization and clutch/gear engagement strategies based upon modified engine operating parameters in response to vehicle loading.

6. The method of claim 1, wherein said engine controller modifies an adaptive cruise system set speed or vehicle follow distance based upon vehicle load.

7. The method of claim 1, wherein engine controller sets at least one of horsepower to torque ratio (hp/tq), cruise control with engine brakes, engine brake control, engine maximum torque limits, vehicle speed limit (vsl), engine fueling in response to vehicle load.

8. The method of claim 1, wherein vehicle braking system may modify at least one of braking levels, braking timing for application of brakes; wheel speed and vehicle speed brake thresholds based upon vehicle loading information.

9. The method of claim 1, wherein engine load based power settings are made by determining gross vehicle weight, setting hp/tq levels, setting transmission shift schedule in response to engine hp/tq, and determining engine rpm per loading on terrain.

10. A vehicle system for controlling a vehicle powertrain based upon actual vehicle load, said vehicle having at least one wheel and axle, comprising
    a vehicle powertrain comprised of an electronically controlled engine having a controller with operating software and memory, a clutch, a transmission with a electronic control unit (ECU) having transmission operating software and memory, and a computer area network (CAN) for communication of data signals to all powertrain components; and
    at least one sensor in close proximity to said at least one vehicle axle to generate data signals indicative of actual vehicle weight for transmission over said digital communication link to said engine controller, said engine controller responsive to vehicle load data signals to modify engine operating parameters based upon vehicle load also wherein said modified engine parameters are transmitted over said digital communication link to the powertrain components;

wherein said vehicle load data signal is transmitted over said digital communication link to multiple powertrain components.

11. The system of claim 10, wherein said engine operating parameters include engine speed (rpm), engine torque, adaptive cruise control systems, cruise control, engine compression brakes, engine exhaust brakes, transmission retarders, engine fueling, vehicle speed limit.

12. The system of claim 10, wherein said powertrain components include at least two of an adaptive cruise system, a vehicle braking control system, an engine control system, and a transmission control system.

13. The system of claim 12, wherein said adaptive cruise system modifies at least one of cruise control set speed and vehicle follow distance based upon vehicle loading information.

14. The system of claim 12, wherein said vehicle braking system modifies at least one of vehicle braking levels, vehicle braking timing, vehicle speed brake thresholds based upon vehicle loading information.

15. The system of claim 12, wherein said engine control system modifies at least one of horsepower (hp), torque (tq), hp/tq, hp/tq cruise control with engine brakes; maximum speed limit, engine brake control including compression brake, exhaust brake, and transmission retarder.

16. The system of claim 12, wherein said transmission modifies at least one of transmission shift points, and transmission synchronization based upon vehicle loading.

* * * * *